(12) United States Patent
Damnjanovic et al.

(10) Patent No.: US 9,590,791 B2
(45) Date of Patent: Mar. 7, 2017

(54) UPLINK TRANSMISSION FOR CARRIER AGGREGATION VIA MULTIPLE NODES

(71) Applicant: QUALCOMM Incorporated, San Diego, CA (US)

(72) Inventors: Jelena Damnjanovic, Del Mar, CA (US); Yongbin Wei, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 14/076,907

(22) Filed: Nov. 11, 2013

(65) Prior Publication Data

US 2014/0133474 A1    May 15, 2014

Related U.S. Application Data

(60) Provisional application No. 61/725,368, filed on Nov. 12, 2012, provisional application No. 61/725,399, filed on Nov. 12, 2012.

(51) Int. Cl.
*H04B 7/00* (2006.01)
*H04L 5/00* (2006.01)
(Continued)

(52) U.S. Cl.
CPC .......... *H04L 5/0078* (2013.01); *H04L 5/0035* (2013.01); *H04L 5/0053* (2013.01);
(Continued)

(58) Field of Classification Search
CPC ............................ H04W 76/025; H04W 88/06
(Continued)

(56) References Cited

U.S. PATENT DOCUMENTS 8,614,978 B2 * 12/2013 Che et al. .................... 370/328
8,804,632 B2 *  8/2014 Lee et al. ..................... 370/329
(Continued)

FOREIGN PATENT DOCUMENTS

WO    WO-2012136269 A1    10/2012

OTHER PUBLICATIONS

TS 136 213 V11.0.0, LTE Physical layer procedures, 3GPP, Oct. 2012, pp. 1-145.*
(Continued)

*Primary Examiner* — Dmitry H Levitan
(74) *Attorney, Agent, or Firm* — Norton Rose Fulbright US LLP

(57) ABSTRACT

Uplink control channel management is disclosed in which a user equipment receives a configuration for multiple uplink control channels for transmission to multiple nodes in multiflow communication with the UE. The UE generates the uplink control channels based on the configuration, wherein each of the uplink control channels is generated for a corresponding one of the nodes. The UE then transmits each of the uplink control channels to the corresponding node. For UEs capable of multiple uplink transmissions, in which the UE communicates with at least one of the nodes over multiple component carriers (CCs), the configuration may designate with of the multiple CCs the UE should transmit the uplink control channel for that node. For UEs capable of only single uplink transmissions, the configuration may designate the transmission of the uplink control channels in either frequency division multiplex (FDM) or time division multiplex (TDM) schemes.

27 Claims, 13 Drawing Sheets

(51) Int. Cl.

| | |
|---|---|
| *H04W 52/14* | (2009.01) |
| *H04W 52/30* | (2009.01) |
| *H04W 72/04* | (2009.01) |
| *H04W 52/02* | (2009.01) |
| *H04W 52/32* | (2009.01) |
| *H04W 52/34* | (2009.01) |
| *H04W 52/36* | (2009.01) |
| *H04W 76/04* | (2009.01) |
| *H04L 25/02* | (2006.01) |
| *H04W 56/00* | (2009.01) |

(52) U.S. Cl.
CPC ..... *H04W 52/0216* (2013.01); *H04W 52/146* (2013.01); *H04W 52/30* (2013.01); *H04W 52/325* (2013.01); *H04W 52/346* (2013.01); *H04W 52/365* (2013.01); *H04W 72/0413* (2013.01); *H04W 76/048* (2013.01); *H04L 5/001* (2013.01); *H04L 5/0042* (2013.01); *H04L 5/0048* (2013.01); *H04L 25/0224* (2013.01); *H04W 56/0005* (2013.01); *H04W 56/0045* (2013.01); *Y02B 60/50* (2013.01)

(58) Field of Classification Search
USPC ........ 370/310, 328, 329, 330, 336, 343, 345
See application file for complete search history.

(56) References Cited

U.S. PATENT DOCUMENTS

| | | | |
|---|---|---|---|
| 8,831,690 B2* | 9/2014 | Perets et al. | 455/574 |
| 8,923,253 B2* | 12/2014 | Park et al. | 370/336 |
| 8,964,593 B2 | 2/2015 | Dinan | |
| 8,964,793 B2* | 2/2015 | Jang | H04L 5/001 370/509 |
| 8,989,025 B2* | 3/2015 | Kazmi et al. | 370/252 |
| 9,014,138 B2* | 4/2015 | Fong et al. | 370/331 |
| 9,301,183 B2 | 3/2016 | Heo et al. | |
| 2011/0305161 A1* | 12/2011 | Ekpenyong et al. | 370/252 |
| 2012/0257569 A1 | 10/2012 | Jang et al. | |
| 2013/0142113 A1* | 6/2013 | Fong et al. | 370/328 |
| 2014/0029558 A1* | 1/2014 | Frederiksen et al. | 370/329 |
| 2014/0071862 A1* | 3/2014 | Ji et al. | 370/280 |
| 2014/0119304 A1* | 5/2014 | Li | 370/329 |
| 2014/0133415 A1 | 5/2014 | Damnjanovic et al. | |
| 2014/0348105 A1* | 11/2014 | Rosa et al. | 370/329 |
| 2015/0319753 A1 | 11/2015 | Chen et al. | |

OTHER PUBLICATIONS

CMCC: " Discussion on support of different TDD UL-DL configurations on different bands", 3GPP Draft; R1-113452 Discussion on Support of Different TDD UL-DL Configurations on Different Bands, 3rd Generation Partnership Project (3GPP), MOB1 Le Competence Centre ; 658, Route Des Lucioles ; F-86921 Sophi A-Anti Polis Cedex ; France, vol. RAN WG1, No. Zhuhai; Oct. 10, 2011, Oct. 5, 2011 (2011-18-85), XP050538540, section 1 section 2.1 section 3.4.1, 'Scenario 1'.

International Search Report and Written Opinion—PCT/US2013/069631—ISA/EPO—Apr. 23, 2014.

Partial International Search Report—PCT/US2013/069608—ISA/EPO—Feb. 28, 2014.

QUALCOMM Incorporated: 'Air interface considerations for dual connectivity', 3GPP Draft; R2-131159; 3rd Generation Partnership Project (3GPP), Mobile Competence Centre; 650, Route Des Lucioles; F-06921 Sophia-Antipolis Cedex; France f vol. RAN W62, No. #81bis Apr. 4, 2013, XP050699140, Retrieved from the Internet: URL:http://www.3gpp.org/ftp/tsg_ran/WG2_RL2/TSGR2_81bisiDocs/.

QUALCOMM Incorporated: "Details on UL power control in carrier aggregation setting", 3GPP Draft; R1-101480 UL Power Control for MC, 3rd Generation Partnership Project (3GPP), Mobile Competence Centre; 650, Route Des Lucioles; F-06921 Sophia-Anti Polis Cedex; France, vol. RAN WG1, no. San Francisco, USA; 20100222, Feb. 16, 2010, XP050418934 [retrieved on Feb. 16, 2010] the whole document.

Seidel E., "LTE-A Carrier Aggregation Enhancements in Release 11", Aug. 28, 2012, XP055100680, Retrieved from the Internet: URL: http://www.nomore.de/uploads/44/31/4431565c44fed73a799493f63b07aeaf/NewsletterNomor_CA_Enhancements_2012-08.pdf [retrieved on Feb. 6, 2014] p. 1, left-hand column.

International Search Report and Written Opinion—PCT/US2013/069608—ISA/EPO—Jun. 5, 2014.

Taiwan Search Report—TW102141187—TIPO—Apr. 30, 2015.
Taiwan Search Report—TW102141186—TIPO—Mar. 10, 2015.
Taiwan Search Report—TW102141186—TIPO—Dec. 22, 1015.

"3rd Generation Partnership Project; Technical Specification Group Radio Access Network; Evolved Universal Terrestrial Radio Access (EUTRA) and Evolved Universal Terrestrial Radio Access Network (EUTRAN); Overall description; Stage 2 (Release 11)", 3GPP Standard; 3GPP TS 36.300, 3rd Generation Partnership Project (3GPP), Mobile Competence Centre; 650, Route Des Lucioles; F-06921 Sophia-Antipolis Cedex; France, vol. RAN WG2, No. V11.3.0, Sep. 24, 2012 (Sep. 24, 2012), pp. 1-205, XP050649950, [retrieved on Sep. 24, 2012].

CATT: "Signaling for TAG Configuration", 3GPP Draft; R2-115791, 3rd Generation Partnership Project (3GPP), Mobile Competence Centre; 650, Route Des Lucioles; F-06921 Sophia-Antipolis Cedex; France, vol. RAN WG2, No. San Francisco, USA; Nov. 14, 2011-Nov. 18, 2011, Nov. 8, 2011 (Nov. 8, 2011), XP050564300, [retrieved on Nov. 8, 2011].

NTT Docomo et al., "Discussion on Multiple-TA Capability Signalling", 3GPP Draft; R2-125591 Discussion On Multiple-TA Capability Signaling, 3rd Generation Partnership Project (3GPP), Mobile Competence Centre; 650, Route Des Lucioles; F-06921 Sophia-Antipolis Cedex; F vol. RAN WG2, No. New Orleans, USA; Nov. 12, 2012-Nov. 16, 2012 Nov. 3, 2012 (Nov. 3, 2012), XP050667458, Retrieved from the Internet: URL: http://www.3gpp.org/ftp/tsg_ran/WG2_RL2/TSGR2_80/Docs/ [retrieved on Nov. 3, 2012].

\* cited by examiner

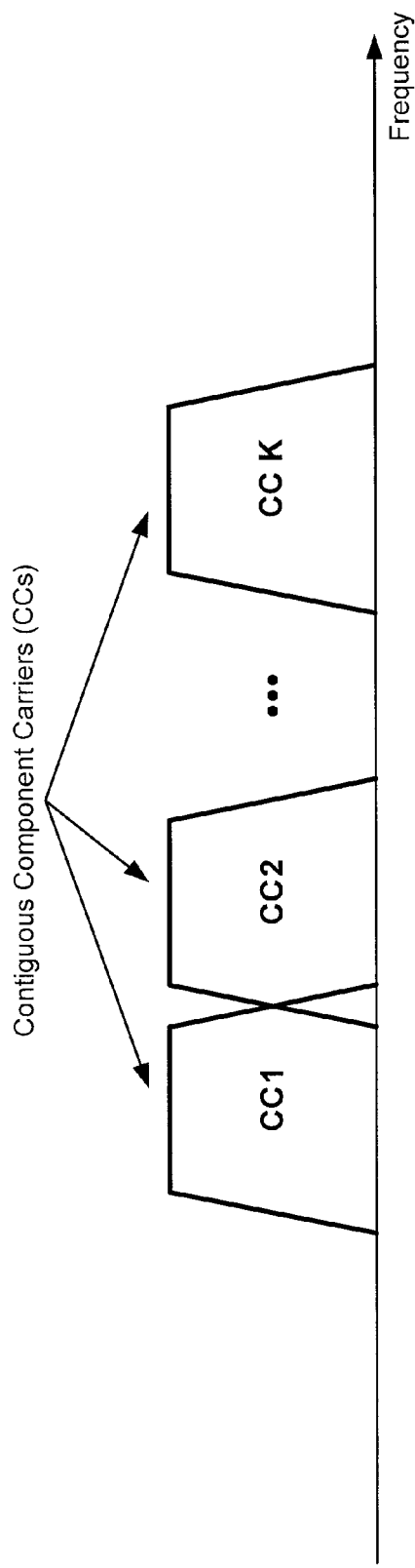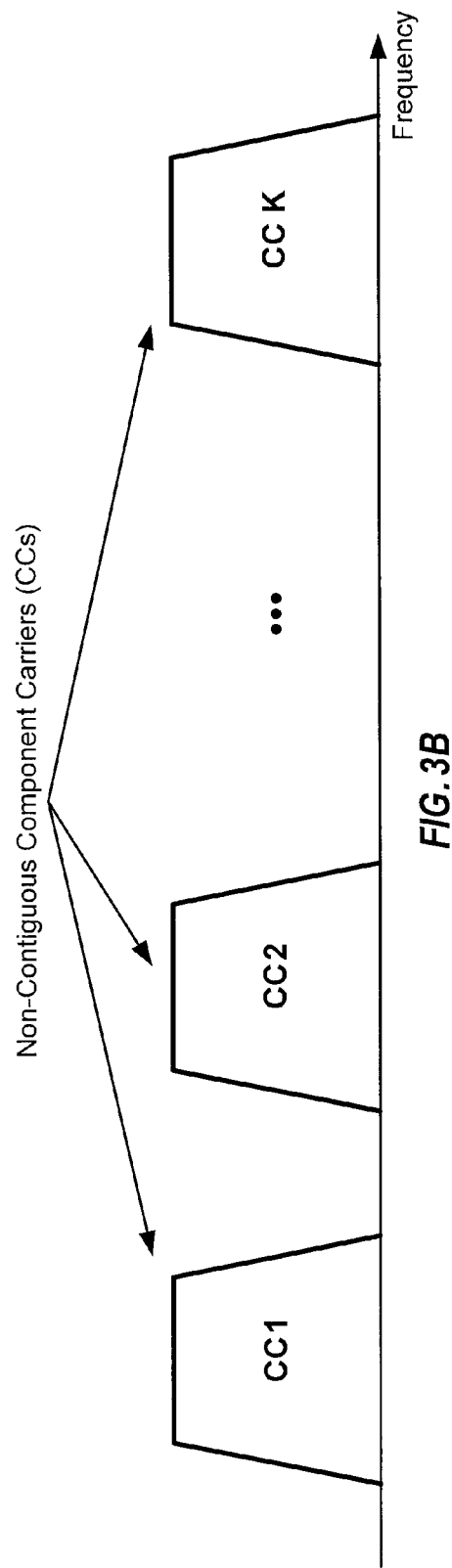
FIG. 3A
FIG. 3B

UPLINK TRANSMISSION FOR CARRIER AGGREGATION VIA MULTIPLE NODES

CROSS-REFERENCE TO RELATED APPLICATIONS

This application claims the benefit of U.S. Provisional Patent Application No. 61/725,368, entitled, "UPLINK CONTROL AND DATA TRANSMISSION IN MULTI-FLOW-ENABLED NETWORKS," filed on Nov. 12, 2012, and U.S. Provisional Patent Application No. 61/725,399, entitled, "UPLINK TRANSMISSION FOR CARRIER AGGREGATION VIA MULTIPLE NODES," filed on Nov. 12, 2012, which are expressly incorporated by reference herein in its entirety.

BACKGROUND

Field

The present disclosure relates generally to communication, and more specifically to techniques for sending control information in a wireless communication network.

Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple access networks include Code Division Multiple Access (CDMA) networks. Time Division Multiple Access (TDMA) networks. Frequency Division Multiple Access (FDMA) networks. Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A wireless communication network may support operation on multiple carriers. A carrier may refer to a range of frequencies used for communication and may be associated with certain characteristics, which may be conveyed in system information that describes operation on the carrier. A carrier may also be referred to as a component carrier (CC), a frequency channel, a cell, etc. A base station may send data transmission on multiple carriers for the downlink (or downlink carriers) to a UE. The UE may send control information on a carrier for the uplink (or uplink carrier) to support data transmission on the multiple downlink carriers.

SUMMARY

The various aspects of the present disclosure are direct to methods, apparatus, non-transitory computer readable media that include program code that causes a computer to perform various actions and features, and apparatus that include processors and memory configured to perform the actions and functionality as described herein. Each of these methods, apparatuses, and media may embody various aspects and features as described herein and illustrated in the accompanying figures. Such examples provide only non-limiting implementations of the concepts and elements described herein.

In an additional aspect of the disclosure, a method of wireless communication includes receiving, at a UE, a configuration of a plurality of uplink control channels for transmitting one or more uplink control signals by the UE, generating, by the UE, the plurality of uplink control channels based on the configuration, wherein each of the plurality of uplink control channels is generated for a corresponding one of a plurality of nodes in multiflow communication with the UE, wherein each of the plurality of nodes is non co-located with each other, and transmitting, by the UE, each of the plurality of uplink control channels to the corresponding one of the plurality of nodes.

In an additional aspect of the disclosure, a computer program product has a computer-readable medium having program code recorded thereon. This program code includes code to receive, at a UE, a configuration of a plurality of uplink control channels for transmitting one or more uplink control signals by the UE, code to generate, by the UE, the plurality of uplink control channels based on the configuration, wherein each of the plurality of uplink control channels is generated for a corresponding one of a plurality of nodes in multiflow communication with the UE, wherein each of the plurality of nodes is non co-located with each other, and code to transmit, by the UE, each of the plurality of uplink control channels to the corresponding one of the plurality of nodes.

In an additional aspect of the disclosure, an apparatus includes at least one processor and a memory coupled to the processor. The processor is configured to receive, at a UE, a configuration of a plurality of uplink control channels for transmitting one or more uplink control signals by the UE, to generate, by the UE, the plurality of uplink control channels based on the configuration, wherein each of the plurality of uplink control channels is generated for a corresponding one of a plurality of nodes in multiflow communication with the UE, wherein each of the plurality of nodes is non co-located with each other, and to transmit, by the UE, each of the plurality of uplink control channels to the corresponding one of the plurality of nodes.

BRIEF DESCRIPTION OF THE DRAWINGS

FIG. 3A shows an example of contiguous carrier aggregation.

FIG. 3B shows an example of non-contiguous carrier aggregation. K CCs may be available for communication and may be separate from each other.

DETAILED DESCRIPTION

Techniques for sending control information to multiple, non co-located nodes in support of carrier aggregation are disclosed herein. These techniques may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 includes IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi and Wi-Fi Direct), IEEE 802.16 (WiMAX), IEEE 802.20, Flash-OFDM®, etc. UTRA, E-UTRA, and GSM are part of Universal Mobile Telecommunication System (UMTS). 3GPP Long Term Evolution (LTE) and LTE-Advanced (LTE-A), in both frequency division duplexing (FDD) and time division duplexing (TDD), are recent releases of UMTS that use E-UTRA, which employs OFDMA on the downlink and SCFDMA on the uplink. UTRA, E-UTRA, GSM, UMTS, LTE and LTE-A are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
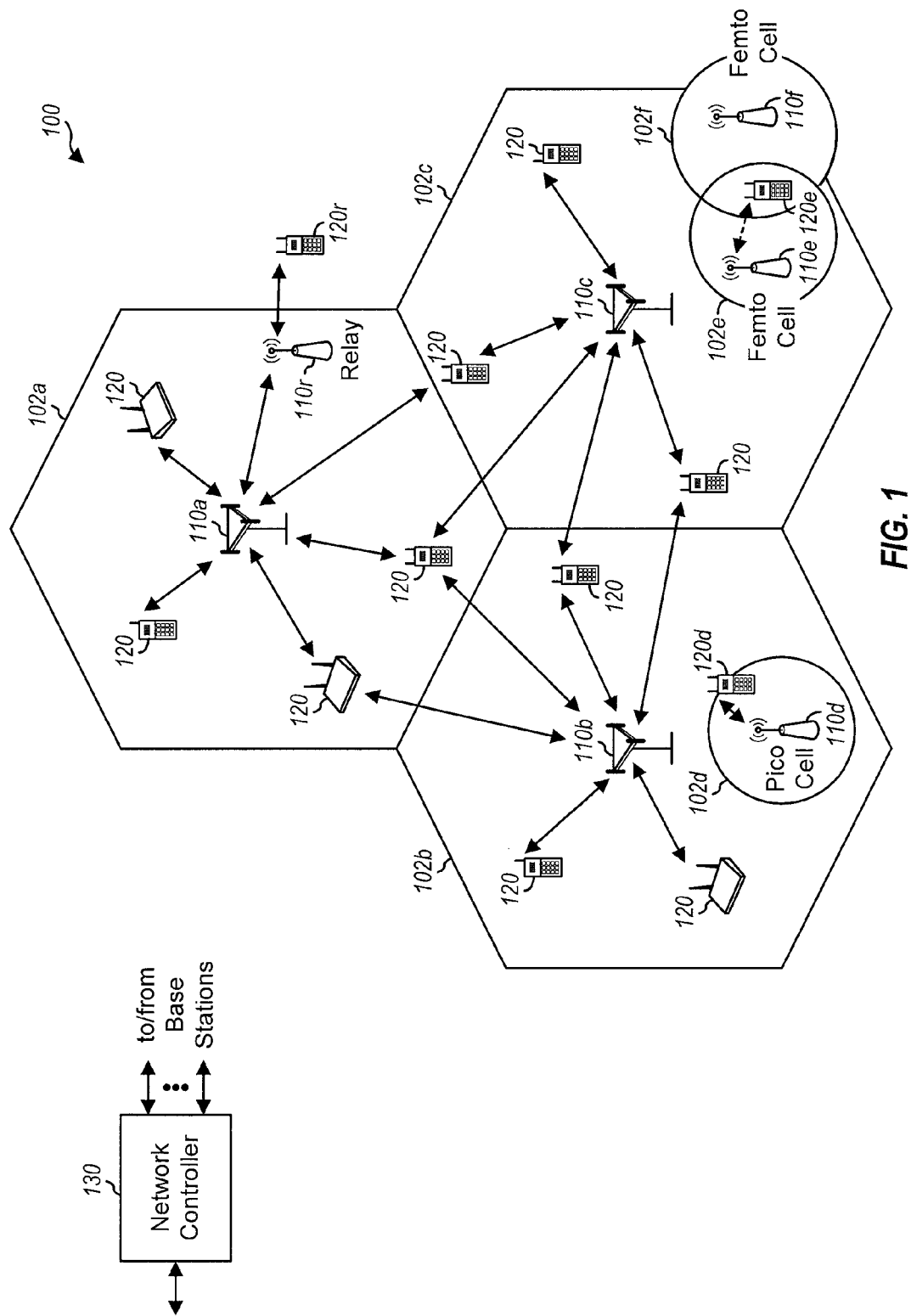
FIG. 1 is a block diagram conceptually illustrating an example of a mobile communication system.

FIG. 1 shows a wireless communication network 100, which may be an LTE network or some other wireless network. Wireless network 100 may include a number of evolved Node Bs (eNBs) 110 and other network entities. An eNB may be a station that communicates with the UEs and may also be referred to as a node, a base station, a Node B, an access point, etc. Each eNB 110 may provide communication coverage for a particular geographic area and may support communication for the UEs located within the coverage area. In 3GPP, the term "cell" can refer to a coverage area of an eNB and/or an eNB subsystem serving this coverage area, depending on the context in which the term is used. An eNB may support one or multiple (e.g., three) cells.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, eNBs 110a, 110b and 110c may be macro eNBs for macro cells 102a, 102b and 102c, respectively. eNB 110d may be a pico eNB for a pico cell 102d. eNBs 110e and 110f may be femto eNBs for femto cells 102e and 102f, respectively.

Wireless network 100 may also include relays. In the example shown in FIG. 1, a relay 110r may communicate with eNB 110a and a UE 120r in order to facilitate communication between eNB 110a and UE 120r.

A network controller 130 may couple to a set of eNBs and provide coordination and control for these eNBs. Network controller 130 may communicate with the eNBs via a backhaul. The eNBs may also communicate with one another, e.g., directly or indirectly via wireless or wireline backhaul.

UEs 120 may be dispersed throughout wireless network 100, and each UE may be stationary or mobile. A UE may also be referred to as a terminal, a mobile station, a subscriber unit, a station, etc. A UE may be a cellular phone, a smartphone, a tablet, a personal digital assistant (PDA), a wireless modem, a wireless communication device, a handheld device, a laptop computer, a cordless phone, a wireless local loop (WLL) station, a netbook, a smartbook, etc. A UE may be able to communicate with macro eNBs, pico eNBs, femto eNBs, relays, etc.

Wireless network 100 may utilize FDD and/or TDD. For FDD, the downlink and uplink may be allocated separate frequency channels. Downlink transmissions may be sent on one frequency channel, and uplink transmissions may be sent on another frequency channel. For TDD, the downlink and uplink may share the same frequency channel, and downlink transmissions and uplink transmissions may be sent on the same frequency channel in different time periods.

LTE utilizes orthogonal frequency division multiplexing (OFDM) on the downlink and single-carrier frequency division multiplexing (SC-FDM) on the uplink. OFDM and SC-FDM partition a frequency range for a carrier into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the carrier bandwidth. For example, $N_{FFT}$ be equal to 128, 256, 512, 1024 or 2048 for a carrier bandwidth of 1.4, 2.5, 5, 10 or 20 MHz, respectively. The carrier bandwidth may also be partitioned into a number of subbands, and each subband may cover a frequency range, e.g., 1.08 MHz.

The available time-frequency resources for a carrier may be partitioned into resource blocks. The number of resource blocks for a carrier in each slot may be dependent on the carrier bandwidth and may range from 6 to 110. Each resource block may cover 12 subcarriers in one slot and may include a number of resource elements. Each resource element may cover one subcarrier in one symbol period and may be used to send one modulation symbol, which may be a real or complex value.

Figure 2A:
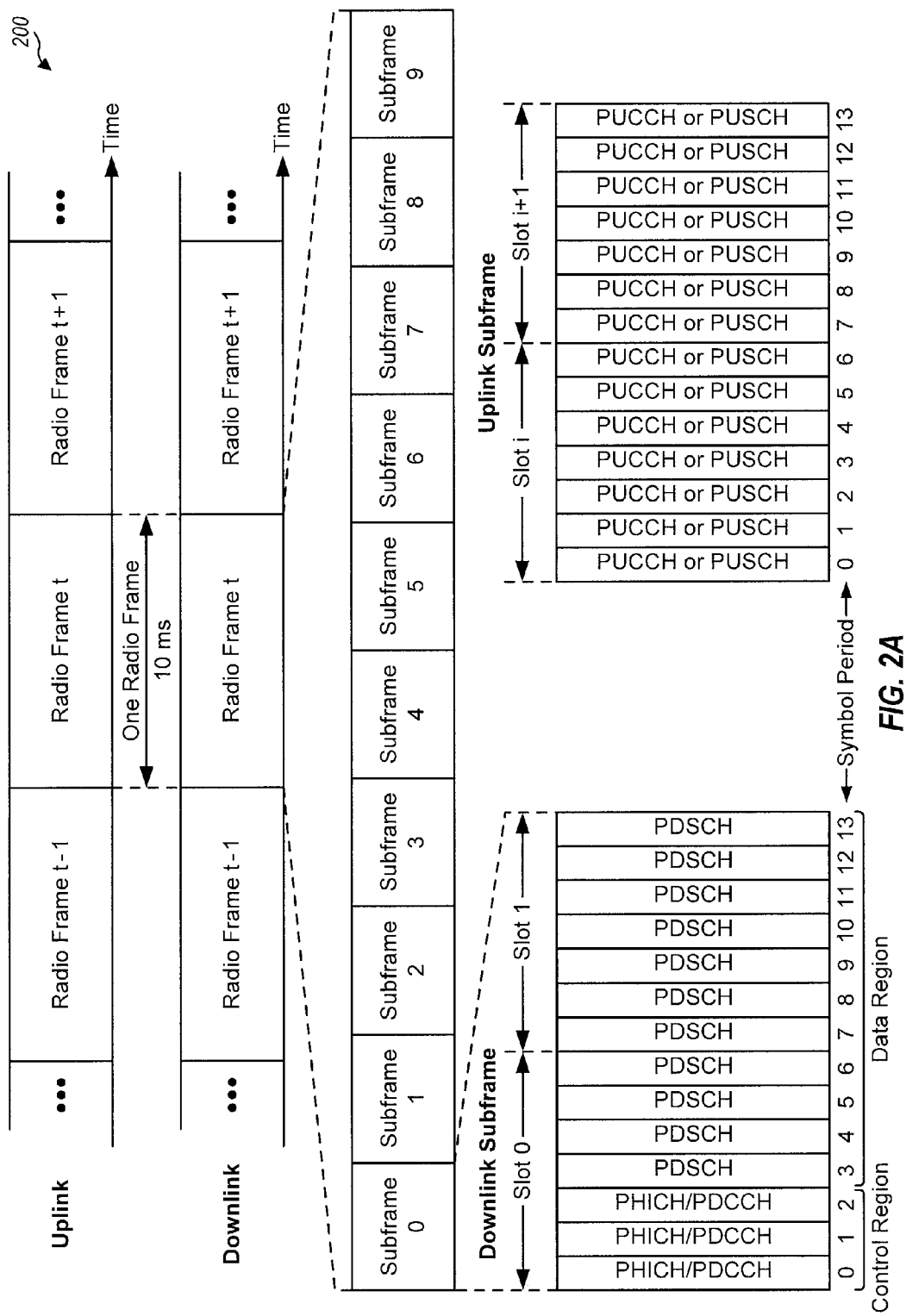
FIG. 2A shows an exemplary frame structure for FDD in LTE.

FIG. 2A shows an exemplary frame structure 200 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2A) or six symbol periods for an extended cyclic prefix. The 2L symbol periods in each subframe may be assigned indices of 0 through 2L-1. For FDD, each subframe for a carrier used for the downlink may be referred to as a downlink subframe. Each subframe for a carrier used for the uplink may be referred to as an uplink subframe.

A downlink subframe may include a control region and a data region, which may be time division multiplexed (TDM). The control region may include the first Q symbol periods of the downlink subframe, where Q may be equal to 1, 2, 3 or 4 and may change from subframe to subframe. The data region may include the remaining symbol periods of the downlink subframe.

A cell may transmit a Physical Downlink Control Channel (PDCCH), a Physical HARQ Indicator Channel (PHICH), and/or other physical channels in the control region of a downlink subframe. The PDCCH may carry downlink control information (DCI) such as downlink grants, uplink grants, etc. The PHICH may carry acknowledgement/negative acknowledgement (ACK/NACK) for data transmission sent by UEs on the uplink with hybrid automatic retransmission (HARQ). The cell may also transmit a Physical Downlink Shared Channel (PDSCH) and/or other physical channels in the data region of a downlink subframe. The PDSCH may carry data for UEs scheduled for data transmission on the downlink and/or other information.

Figure 2B:
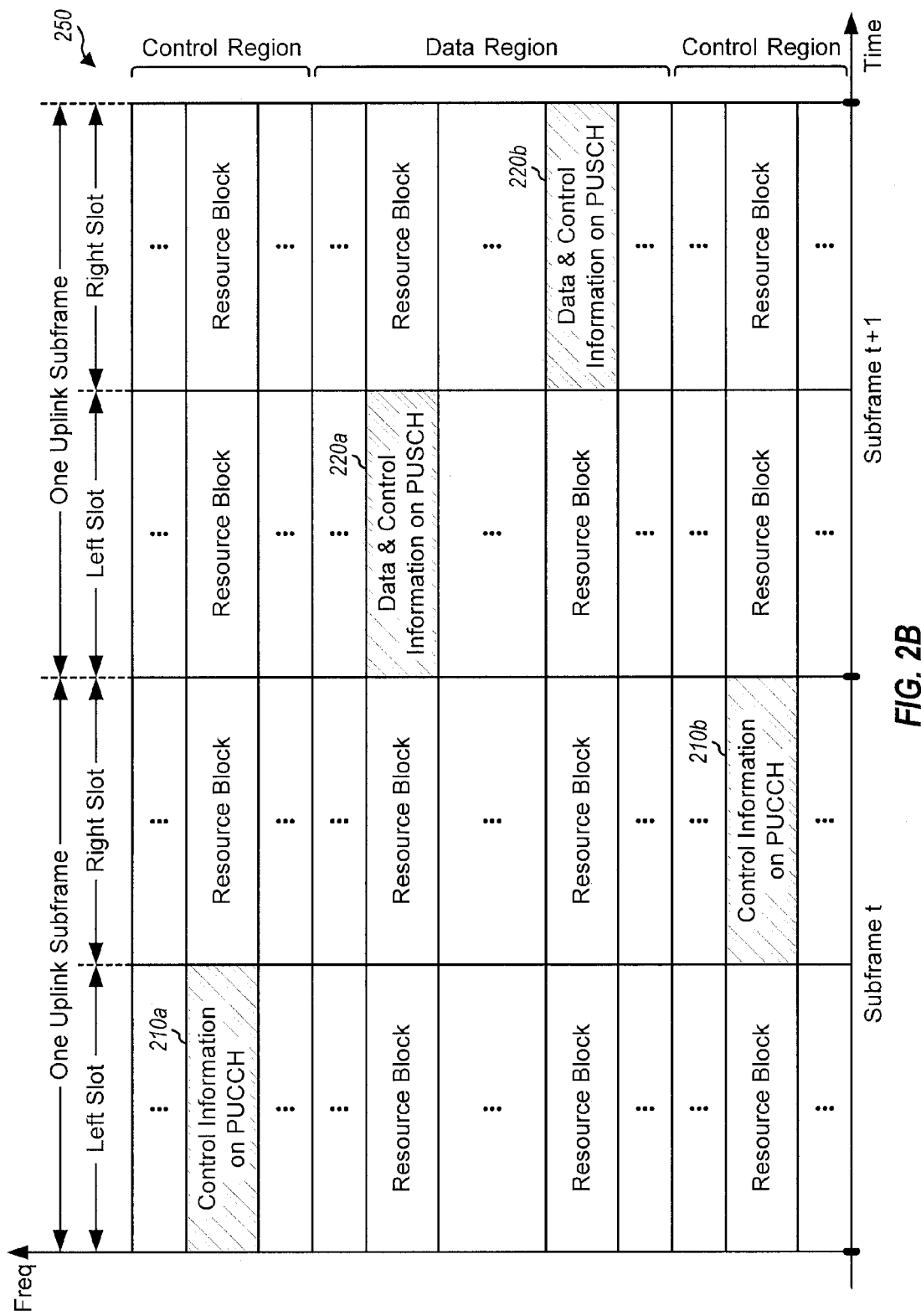
FIG. 2B shows an exemplary transmission structure for the uplink on one carrier in LTE.

FIG. 2B shows an exemplary transmission structure 250 for the uplink on one carrier in LTE. An uplink subframe may include a control region and a data region, which may be frequency division multiplexed (FDM). The control section may be formed at the two edges of the carrier bandwidth (as shown in FIG. 2B) and may have a configurable size. The data section may include all resource blocks not included in the control section. A UE may be assigned two resource blocks 210a and 210b (or possibly more than two resource blocks) in the control region in two slots of one subframe to send control information on a Physical Uplink Control Channel (PUCCH). The two resource blocks may occupy different sets of subcarriers when frequency hopping is enabled, as shown in FIG. 2B. The UE may be assigned two resource blocks 220a and 220b (or possibly more than two resource blocks) in the data region in two slots of one subframe to send only data or both data and control information on a Physical Uplink Shared Channel (PUSCH).

Wireless network 100 may support operation on multiple carriers, which may be referred to as carrier aggregation (CA) or multi-carrier operation. A carrier may also be referred to as a component carrier (CC), a cell, etc. The terms "carrier", "CC", and "cell" are used interchangeably herein. A carrier used for the downlink may be referred to as a downlink CC, and a carrier used for the uplink may be referred to as an uplink CC. A UE may be configured with multiple downlink CCs and one or more uplink CCs for carrier aggregation. An eNB may transmit data and control information on one or more downlink CCs to the UE. The UE may transmit data and control information on one or more uplink CCs to the eNB.

FIG. 3A shows an example of contiguous carrier aggregation. K CCs may be available for communication and may be adjacent to each other, where K may be any integer value.

FIG. 3B shows an example of non-contiguous carrier aggregation. K CCs may be available for communication and may be separate from each other.

Figure 4:
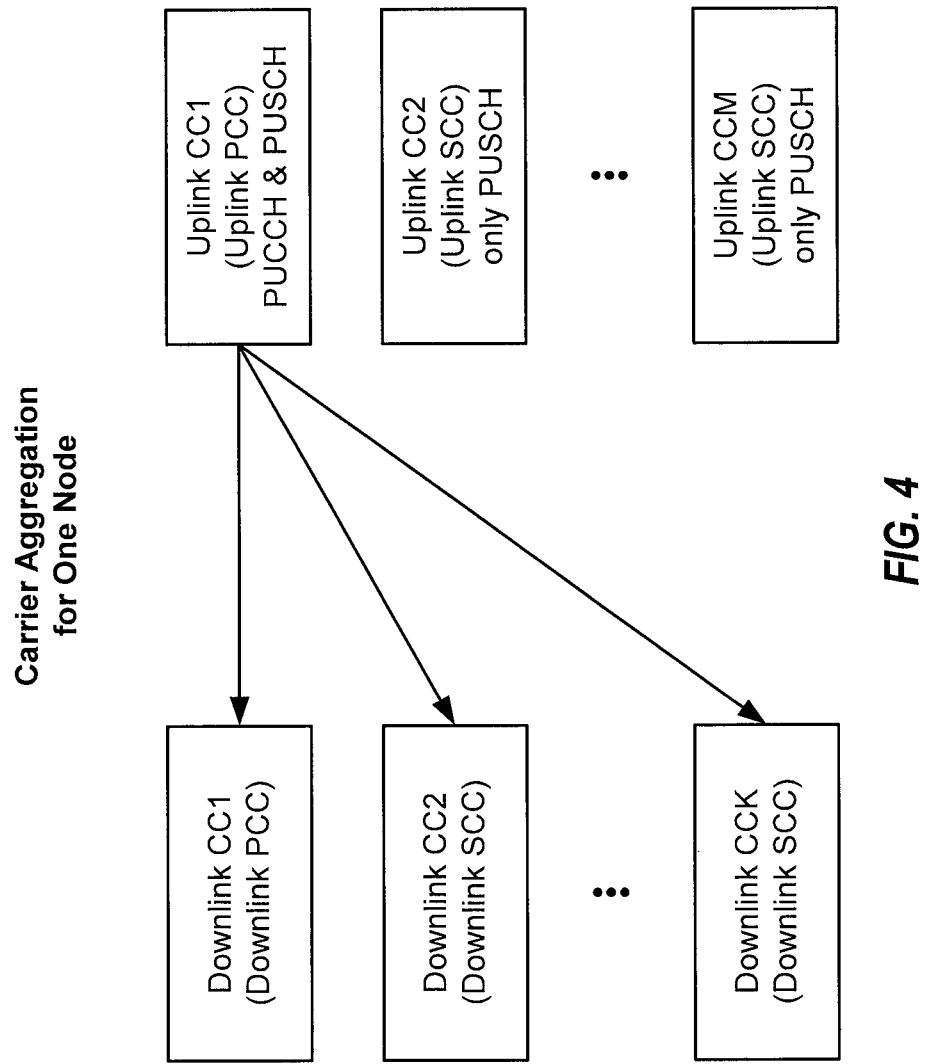
FIG. 4 shows an example of carrier aggregation.

FIG. 4 shows an example of carrier aggregation. A UE may be configured with K downlink CCs 1 through K and M uplink CCs 1 through M for communication with one node, where K>1 and M>1 for carrier aggregation. A node may be an eNB, a relay, or some other transmitting entity. In LTE Release 10, the UE may be configured with up to five CCs for each of the downlink and uplink for carrier aggregation. Each CC may have a bandwidth of up to 20 MHz and may be backward compatible with LTE Release 8. The UE may thus be configured with up to 100 MHz for up to five CCs on each of the downlink and uplink.

In one design, one downlink CC may be designated as a downlink primary CC (PCC), and each remaining downlink CC may be referred to as a downlink secondary CC (SCC). Similarly, one uplink CC may be designated as an uplink PCC, and each remaining uplink CC may be referred to as an uplink SCC. A primary CC may also be referred to as a primary cell (PCell), and a secondary CC may also be referred to as a secondary cell (SCell). The downlink PCC and the uplink PCC may be semi-statically configured for the UE by higher layers such as Radio Resource Control (RRC). A node may transmit certain information (e.g., grants) on the downlink PCC to the UE, and the UE may transmit certain information (e.g., control information) on the uplink PCC to the node. In one design, the UE may transmit the PUSCH and/or PUCCH on the uplink PCC and may transmit only the PUSCH on an uplink SCC.

A UE may communicate with multiple, non co-located nodes which may be referred to as multiflow operation. Non co-located nodes are nodes not located at a same cell site. The multiple nodes may correspond to different macro eNBs, or a combination of macro eNBs and lower powered eNBs, such as pico, femto, and/or home eNBs, or a combination of eNB(s) and relay(s), etc. In one example, one node is designated as an anchor node for the UE, and each remaining node is designated as a booster node for the UE.

Multiflow operation on the downlink may be supported with packet-level splitting, bearer-level splitting, or some other splitting scheme. For packet-level splitting, packets intended for the UE may be received by the anchor node and may be split among the multiple nodes communicating which the UE. Each node may transmit packets to the UE on a set of downlink CCs configured for the UE at that node. For bearer-level splitting, each node may receive data intended for the UE and may transmit data to the UE on a set of downlink CCs configured for the UE at that node. A bearer may refer to an information transmission path of defined characteristics, e.g., defined capacity, delay, bit error rate, etc. A data bearer is a bearer for exchanging data and may terminate at a UE and a network entity (e.g., a Packet Data Network (PDN) gateway) designated to route data for the UE.

For multiflow operation with carrier aggregation, the UE may be configured with one or more downlink CCs and one or more uplink CCs for each node. The sets of CCs configured for the UE for different nodes may or may not overlap. For example, the UE may be configured with CC X for only a first node and may be configured with CC Y for both the first node and a second node. The UE may be configured with a set of downlink CCs and a set of uplink CCs for all nodes. The UE may be able to communicate with one or more nodes on each configured CC.

The UE may transmit an uplink signal on an uplink CC to a node. The uplink signal may observe a propagation delay, which may be dependent on the wireless channel between the UE and the node. The UE may have its transmit timing adjusted for transmission on the uplink CC, so that the uplink signal from the UE can be received within a specified time window at the node. The node may measure the received time of the uplink signal from the UE. The node may then determine a timing adjustment (TA) for the UE for the uplink CC such that the uplink signal can be properly time aligned at the node. The node may send the timing adjustment to the UE. The UE may adjust its transmit timing for the uplink CC based on the timing adjustment.

The UE may be configured with a set of uplink CCs and may transmit to one or more nodes on each configured CC, as described above. Each uplink CC that is configured for multiple nodes may belong to the same timing adjustment group (TAG) or a different TAG. The same TAG refers to the same timing adjustments for the uplink CC from the multiple nodes. Different TAGs refer to different timing adjustments for the uplink CC from the multiple nodes.

The UE may communicate with multiple non co-located nodes on a set of downlink CCs and a set of uplink CCs for multiflow operation. The UE may be configured with an uplink PCC for each node. The UE may have different uplink PCCs for different nodes and/or may have the same uplink PCC for multiple nodes. In one design, the UE may send a PUCCH to each node on only the uplink PCC for that node. The UE may send control information (e.g., to support data transmission on the downlink) for each node on the PUCCH on the uplink PCC for the node.

Figure 5:
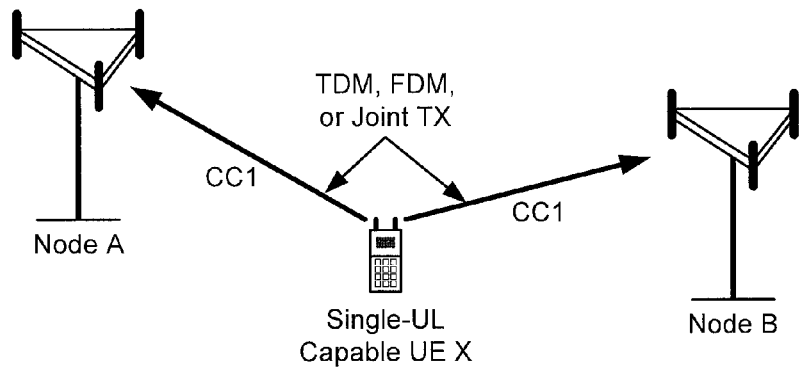
FIG. 5 shows communication between a single-UL capable UE ("X") and two nodes A and B for multiflow operation.

FIG. 5 shows communication between a single-UL capable UE ("X") and two nodes A and B for multiflow operation. A single-UL capable UE is a UE that can transmit on only one uplink CC at a given time, e.g., due to hardware limitations of the UE. UE X may be configured with one or more downlink CCs for node A and one or more downlink CCs for node B. UE X may also be configured with one or more uplink CCs for node A and one or more uplink CCs for node B. In one scenario, UE X may be configured with the same uplink PCC for both nodes A and B. In another scenario, UE X may be configured with different PCCs for nodes A and B but may transmit on only one uplink PCC at any given moment.

A single-UL capable UE may communicate with multiple nodes on a single uplink PCC based on one or more of the following schemes:
 TDM—UE sends control information to different nodes on the uplink PCC in different time intervals, e.g., different subframes,
 FDM—UE sends control information to different nodes in different frequency regions of the uplink PCC, and
 Joint transmission—UE sends control information for all nodes in the same uplink transmission on the uplink PCC.

Figure 6:
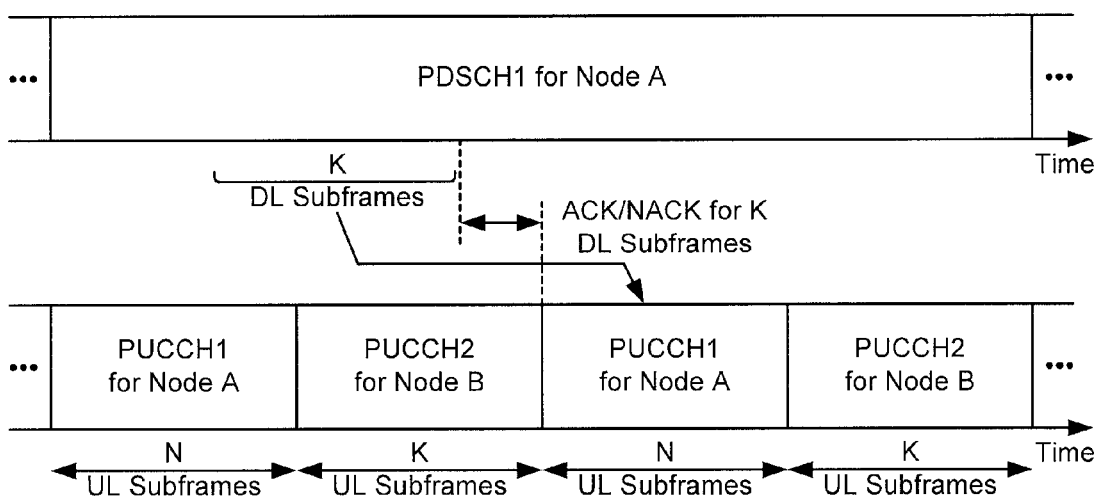
FIG. 6 shows a design of single-UL capable UE X transmitting to multiple nodes A and B on the uplink PCC based on TDM.

FIG. 6 shows a design of single-UL capable UE X transmitting to multiple nodes A and B on the uplink PCC based on TDM. UE X may be configured with a TDM pattern for nodes A and B (e.g., via RRC signaling). The TDM pattern may include first subframes in which UE X can transmit on the uplink PCC to node A and second subframes in which UE X can transmit on the uplink PCC to node B. In the design shown in FIG. 6, UE X may be configured with N consecutive subframes for node A, followed by K consecutive subframes for node B, followed by N consecutive subframes for node A, etc., where N and K may each be any value.

The number of subframes to allocate to (reserved for, or utilized by) each node based on the TDM pattern (e.g., the values of N and K in FIG. 6) may be selected based on various factors such as the expected amount of control information to send to each node, the number of CCs configured for UE X for each node, a target delay in sending control information, retuning time for radio frequency (RF) circuitry within UE X, etc. It may be challenging for UE X to dynamically switch between two or more carrier frequencies with a single transmit (TX) chain. The TDM pattern may be selected such that UE X switches between nodes A and B on the uplink PCC at most every few subframes in order to balance the loss due to retuning of RF circuitry and bundling of control information. For example, UE X may need approximately 300 μs to retune receive circuitry for the downlink and may need similar amount of time for retuning transmit circuitry for the uplink. The number of consecutive subframes to allocate to each node may be selected to mitigate the loss due to such retuning.

As shown in FIG. 6, UE X may send control information on a PUCCH on the uplink PCC to each node in subframes allocated to (or reserved for) that node. UE X may send control information on a first PUCCH (PUCCH 1) to node A in first subframes allocated to node A and may send control information on a second PUCCH (PUCCH2) to node B in second subframes allocated to node B.

UE X may receive data transmission on the downlink from each node in any subframe. UE X may receive downlink data transmission from node A during subframe t and may typically send ACK/NACK for the received data transmission four subframes later in subframe $t+D_{ACK}$, where $D_{ACK}$ is an ACK/NACK feedback delay and may be equal to 4 or some other value. However, due to TDM of the uplink PCC for nodes A and B, subframe $t+D_{ACK}$ may be allocated to node B instead of node A. In this case, UE X may be unable to send ACK/NACK feedback to node A in subframe $t+D_{ACK}$ and may wait for the next available subframe in which UE X can send control information to node A.

In one design, UE X may bundle ACK/NACK for downlink data transmission from each node and may send the bundled ACK/NACK in subframes allocated to that node based on the TDM pattern. The number of subframes in which to bundle ACK/NACK may be referred to as a bundling window size. The bundling window size for each node may be determined by the TDM pattern. For example, UE X may bundle ACK/NACK for node A designated to be sent in subframes allocated to node B, and vice versa. The bundling window size for ACK/NACK for node A may be at most equal to the number of subframes allocated to node B, and vice versa.

UE X may also report channel state information (CSI) for each node in subframes allocated to that node based on the TDM pattern. CSI may include channel quality indicator (CQI), precoding matrix indicator (PMI), precoding type indicator (PTI), rank indicator (RI), and/or other information. RI for a downlink CC may indicate the number of layers to use for transmission of data on the downlink CC. Each layer may be viewed as a spatial channel. PTI for a downlink CC may indicate a precoding type feedback (e.g., wideband versus subband). PMI for a downlink CC may indicate a precoding matrix or vector to use for precoding data prior to transmission on the downlink CC. CQI for a downlink CC may indicate a channel quality for each of at least one packet to send on the downlink CC.

UE X may be configured to periodically report CSI for a downlink CC to a node based on a CSI reporting configuration for that downlink CC. The CSI reporting configuration for a downlink CC may indicate which types of CSI (e.g., CQI, PMI, PTI, and/or RI) to report for that downlink CC, how often to report each type of CSI, the subframes in which to report each type of CSI, etc. The CSI reporting configuration for each downlink CC for each node may be defined such that UE X can send the CSI to the node in subframes allocated to the node based on the TDM pattern. UE X may then periodically send CSI to each node in subframes allocated to the node.

UE X may also be requested to send CSI for one or more downlink CCs to a node in a given subframe via a CSI request. For example, node A may send a CSI request to UE X in subframe t, and UE X may normally send the requested CSI to node A in subframe $t+D_{CSI}$ where $D_{CSI}$ is a CSI feedback delay and may be equal to 4 or some other value. However, subframe $t+D_{CSI}$ be available for node A based on the TDM pattern. In this case, UE X may send the requested CSI in a subframe (e.g., the next subframe) available for node A.

Figure 7A:
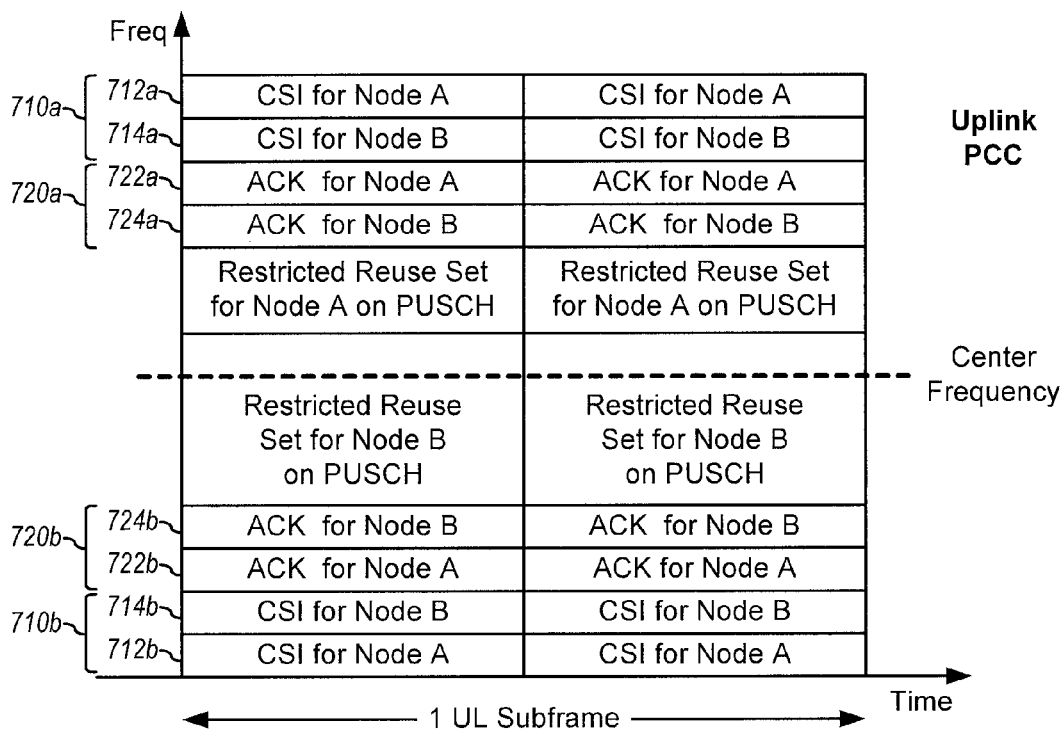
FIG. 7A shows an exemplary design of FDM for two nodes A and B on the uplink PCC.

FIG. 7A shows a design of supporting multiple nodes on a single uplink PCC with FDM. In the example of FIG. 7A, the control region of the uplink PCC may be partitioned into (i) a CSI region comprising frequency regions 710a and 710b and (ii) an ACK region comprising frequency regions 720a and 720b. CSI frequency region 710a may be partitioned into a frequency sub-region 712a reserved for node A and a frequency sub-region 714a reserved for node B. Similarly, CSI frequency region 710b may be partitioned into a frequency sub-region 712b reserved for node A and a frequency sub-region 714b reserved for node B. Frequency sub-regions 712a and 712b for node A may be symmetric with respect to the center frequency of the uplink PCC and may be the same distance from the center frequency. Frequency sub-regions 714a and 714b for node B may also be symmetric with respect to the center frequency.

ACK frequency region 720a may be partitioned into a frequency sub-region 722a reserved for node A and a frequency sub-region 724a reserved for node B. Similarly, ACK frequency region 720b may be partitioned into a frequency sub-region 722b reserved for node A and a frequency sub-region 724b reserved for node B. Frequency sub-regions 722a and 722b for node A may be symmetric with respect to the center frequency. Frequency sub-regions 724a and 724b for node B may also be symmetric with respect to the center frequency.

FIG. 7A shows an exemplary design of FDM for two nodes A and B on the uplink PCC. In this exemplary design, a separate frequency range may be reserved for each node for each type of control information that may be sent separately by UE X on the uplink PCC. FDM for multiple nodes may also be supported in other manners. For example, a single frequency range may be reserved for each node for all types of control information.

UE X may send control information on one or more PUCCHs to one or more nodes in a given subframe. UE X may send control information to each node in one or more resource blocks assigned to UE X in the frequency region reserved for that node. UE X may send control information to multiple nodes on different resource blocks in the same subframes. UE X may set the transmit power of the portion of the uplink transmission for each node based on the channel conditions for that node so that the uplink transmission can be reliably received by the node.

Figure 7B:
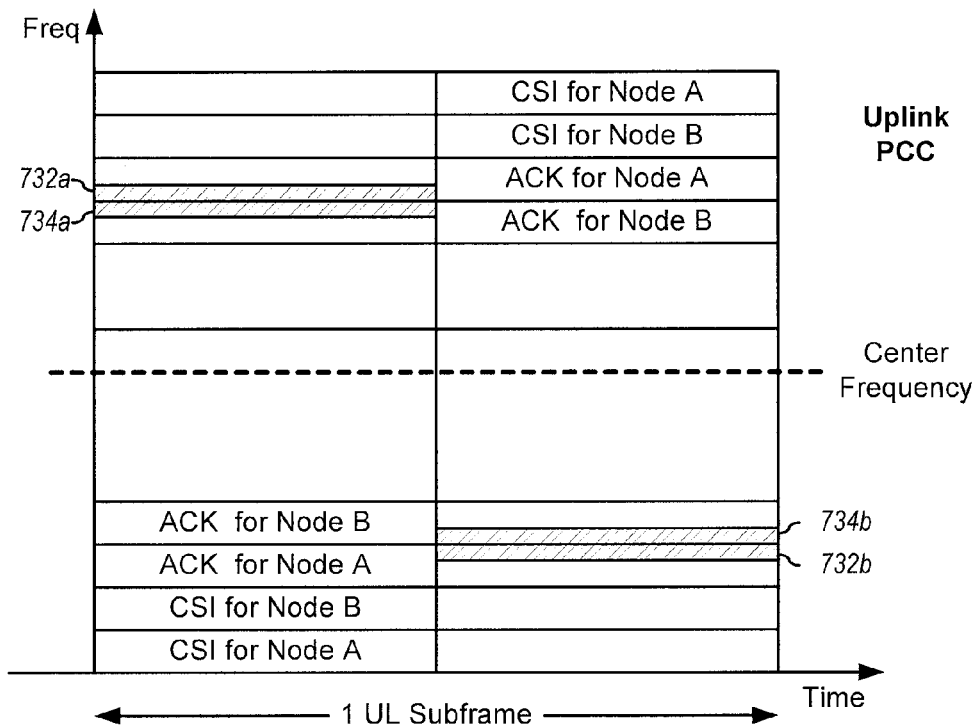
FIG. 7B shows a design of single-UL capable UE X transmitting to multiple nodes A and B on the uplink PCC based on FDM.

FIG. 7B shows a design of single-UL capable UE X transmitting to multiple nodes A and B on the uplink PCC based on FDM. UE X may be configured (e.g., via RRC signaling) with first frequency resources (e.g., resource blocks 732a and 732b) for transmitting a first PUCCH to node A. UE X may also be configured with second frequency resources (e.g., resource blocks 734a and 734b) for transmitting a second PUCCH to node B. UE X may be assigned resource blocks that are symmetric with respect to the center frequency of the uplink PCC with frequency hopping. The PUCCHs for nodes A and B may be multiplexed in frequency in the same subframe. The resource configuration for UE X may be semi-static and may change infrequently, as necessary.

In one design, the resource blocks assigned to UE X for the PUCCHs for different nodes may be contiguous or close together in frequency. Assignment of contiguous resource blocks may enable UE X to maintain a single-carrier waveform for an uplink transmission to multiple nodes. The single-carrier waveform may reduce peak-to-average-power ratio (PAPR), which may be desirable.

UE X may send control information on the PUCCH to each node on the resource block(s) assigned to UE X for that node. UE X may send control information on the PUCCH to each node based on a suitable PUCCH format. LTE Release 11 supports PUCCH formats 1a, 1b, 2, 2a, 2b, 3 and 4. PUCCH format 1a or 1b may be used to send 1 or 2 bits of ACK/NACK on the PUCCH. PUCCH format 2, 2a, or 2b may be used to send up to 10 bits of CSI as well as 0, 1, or 2 bits, respectively, of ACK/NACK on the PUCCH. PUCCH format 3 may be used to send up to 21 bits of CSI and/or ACK/NACK on the PUCCH.

UE X may set the transmit power of the first PUCCH sent on resource blocks 732a and 732b to node A based on the wireless channel between UE X and node A. Similarly, UE X may set the transmit power of the second PUCCH sent on resource blocks 734a and 734b to node B based on the wireless channel between UE X and node B. UE X may transmit the PUCCHs at different transmit power levels to different nodes. UE X may also be power controlled separately by different nodes to achieve good performance for uplink transmissions sent on the PUCCHs.

In the joint transmission scheme, UE X may send a single uplink transmission comprising control information for multiple nodes on the uplink PCC. In one design, UE X may multiplex first control information for node A with second control information for node B. UE X may then process (e.g., encode and symbol map) the multiplexed control information to obtain modulation symbols for transmission on a single PUCCH. In another design, UE X may process (e.g., encode and symbol map) the control information for each node to obtain modulation symbols for each node. UE X may then multiplex the modulation symbols for all nodes. For both designs, UE X may further process (e.g., spread and modulate) the modulation symbols for all nodes to obtain an uplink transmission sent on resource blocks assigned to UE X for transmission to nodes A and B. UE X may set the transmit power of the uplink transmission based on the highest transmit power among the required transmit powers for nodes A and B. UE X may then send the uplink transmission on the uplink PCC to nodes A and B. Each node may receive the uplink transmission from UE X and may process (e.g., demodulate and decode) the uplink transmission from UE X to recover the control information sent to that node.

For the joint transmission scheme, UE X may generate the uplink transmission on the PUCCH based on a set of parameters that is known by all nodes to which the uplink transmission is sent. For example, the uplink transmission may be generated based on a particular cell identity (ID), a particular cell radio network temporary identifier (C-RNTI), a particular resource index for the PUCCH format, a particular orthogonal sequence, etc. The set of parameters may be determined or selected based on a primary cell for UE X, or a cell controlling the transmit power of UE X, or RRC configuration applicable for UE X for both nodes A and B, etc.

A node may receive multiple uplink transmissions on PUCCHs from multiple UEs on the same resource blocks. These UEs may be multiplexed in the code domain with (i) different orthogonal reference signal sequences for spreading across frequency or subcarriers and/or (ii) different orthogonal spreading sequences for spreading across time or symbol periods. These UEs may also be power controlled by the node so that the uplink transmission from each UE is received at a target received signal quality at the node. This may ensure that the uplink transmission from each UE does not cause excessive interference to uplink transmissions from other UEs sent on the same resource blocks.

UE X may send an uplink transmission to nodes A and B on resource blocks assigned to UE X for the joint transmission scheme. The transmit power of the uplink transmission may be controlled by Node A, which may have a worse wireless channel for UE X than node B. The uplink transmission from UE X may be sent at a higher transmit power than necessary for reliable decoding at node B. Other UEs served by node B may also send uplink transmissions on the same resource blocks used by UE X. These other UEs may have their transmit power controlled by node B. UEs multiplexed on the same resource blocks may thus be power controlled by different nodes. This may result in loss of orthogonality and hence interference among the UEs multiplexed on the same resource blocks. This issue may be mitigated by multiplexing UEs (e.g., multiflow UEs and possibly non-multiflow UEs) that are power controlled by the same node on the same resource blocks.

In one scenario, the uplink PCC for UE X may belong in the same TAG for nodes A and B. In this scenario, UE X may receive timing advances from node A and/or node B and may adjust its transmit timing for the uplink PCC based on the timing advances. Uplink transmission from UE X on the uplink PCC would be properly time aligned at nodes A and B.

In another scenario, the uplink PCC for UE X may belong in different TAGs for nodes A and B. In this case, UE X may receive first timing advances from node A for the uplink PCC and may also receive second timing advances from node B for the uplink PCC. UE X may send uplink transmission on the uplink PCC to node A based on the first timing advances in order to ensure that the uplink transmission will be properly time aligned at node A. UE X may send uplink transmission on the uplink PCC to node B based on the second timing advances in order to ensure that the uplink transmission will be properly time aligned at node B.

The TDM scheme may be used for single-UL capable UE X for the scenario in which the uplink PCC belongs in different TAGs. There may be some overlap between subframes allocated for node A and subframes allocated for node B. For example, UE X may have a later transmit time for node A than node B. Subframe t allocated for node A may then overlap subframe t+1 allocated for node B due to the later transmit time of UE X for node A. UE X may send uplink transmissions to account for overlapping subframes for different nodes. For example, UE X may avoid transmitting to node A in the last symbol period of subframe t or may avoid transmitting to node B in the first symbol period of subframe t+1.

Multiflow may be supported for the PUCCH on the uplink. In this case, UE X may send the PUCCH to multiple nodes, as described above. Multiflow for the PUCCH on the uplink may be used to support data transmission on the downlink from the multiple nodes to UE X.

Multiflow may also be supported for the PUSCH on the uplink. In this case, UE X may send data on a PUSCH to multiple nodes using TDM or FDM, e.g., as described above for the PUCCH. For the TDM scheme, UE X may be configured with a TDM pattern for the PUSCH, which may indicate subframes allocated to each node in communication with UE X. The TDM pattern for the PUSCH may be the same as, or different from, the TDM pattern for the PUCCH. CA may support multi-cluster PUSCH transmission. Interference coordination among nodes may be performed in the time domain and/or the frequency domain to mitigate interference on the uplink due to PUSCH transmission by UE X. For example, some subframes and/or some subcarriers may be allocated to each node. UE X may send PUSCH transmission to each node in the subframe and/or the subcarriers allocated to that node.

A multi-UL capable UE is a UE that can transmit on multiple uplink CCs to multiple nodes at any given moment, on one or more uplink CCs to each node. The multi-UL capable UE may be configured with one or more downlink CCs and one or more uplink CCs for each node. The multi-UL capable UE may be configured with downlink CCs and uplink CCs for the multiple nodes via RRC signaling or some other mechanism.

In a first design, a multi-UL capable UE may have one uplink PCC for each node and may have different uplink PCCs for different nodes. The multi-UL capable UE may send control information for all downlink CCs for each node on the uplink PCC for that node. Functions associated with a PCell may be applicable for each node in communication with the UE.

Figure 8A:
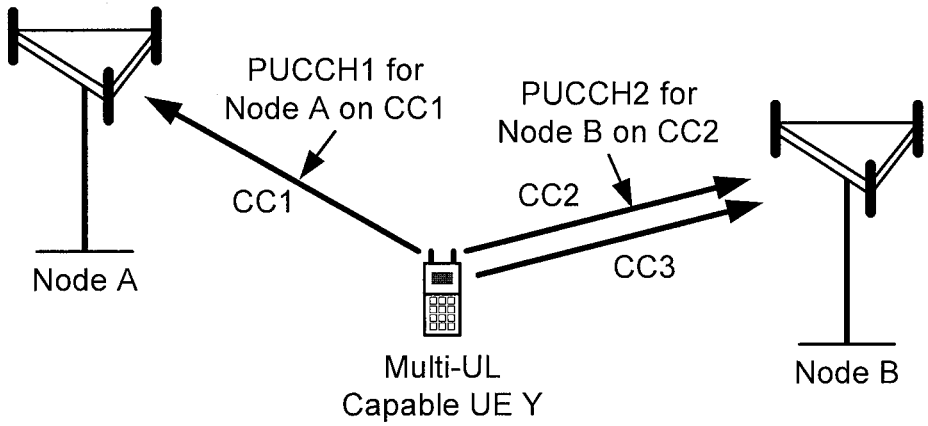
FIG. 8A shows communication between a multi-UL capable UE Y and two nodes A and B for multiflow operation.

FIG. 8A shows communication between a multi-UL capable UE Y and two nodes A and B for multiflow operation. In the example shown in FIG. 8A, UE Y is configured with one uplink CC (CC1) for node A and two uplink CCs (CC2 and CC3) for node B. Uplink CC1 is the uplink PCC for node A, and uplink CC2 is the uplink PCC for node B. UE Y may send control information to node A on a first PUCCH on uplink CC1. UE Y may also send control information to node B on a second PUCCH on uplink CC2.

Uplink CC1 and CC2 may belong in the same TAG. In this case, UE Y may adjust its transmit timing for uplink transmissions on uplink CC1 and CC2 based on timing advances for this TAG. Alternatively, uplink CC1 and CC2 may belong in different TAGs. In this case, UE Y may adjust its transmit timing for uplink transmission on uplink CC1 based on timing advances for uplink CC1.UE Y may adjust its transmit timing for uplink transmission on uplink CC2 based on timing advances for uplink CC2.

In a second design, a multi-UL capable UE may have one common uplink PCC for all nodes. The multi-UL capable UE may communicate with multiple nodes on the common uplink PCC based on one or more of the following schemes:

TDM—UE sends control information to different nodes on the common uplink PCC in different time intervals, e.g., different subframes, FDM—UE sends control information to different nodes in different frequency regions of the common uplink PCC, and Joint transmission—UE sends control information for all nodes in the same uplink transmission on the common uplink PCC.

Figure 8B:
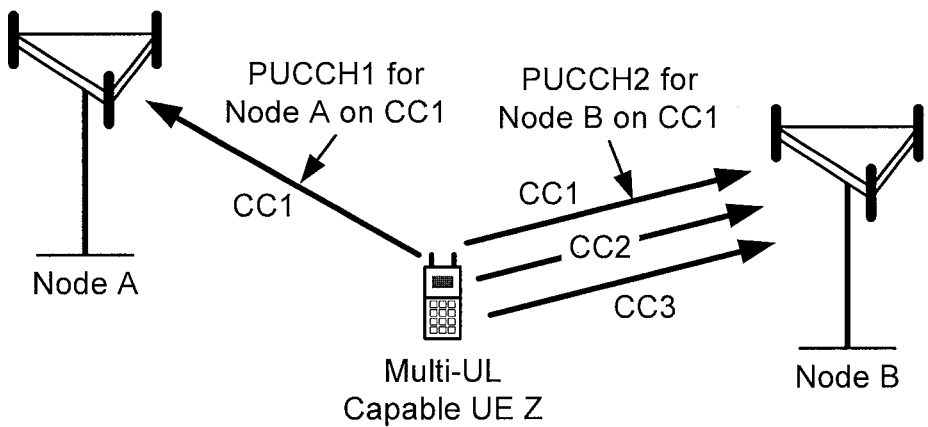
FIG. 8B shows communication between a multi-UL capable UE Z and two nodes A and B for multiflow operation.

FIG. 8B shows communication between a multi-UL capable UE Z and two nodes A and B for multiflow operation. In the example shown in FIG. 8B, UE Z is configured with one uplink CC (CC1) for node A and three uplink CCs (CC1, CC2 and CC3) for node B. Uplink CC1 is the common uplink PCC for both nodes A and B. UE Z may send control information to node A on a first PUCCH via uplink CC1.UE Y may also send control information to node B on a second PUCCH (or possibly the first PUCCH) via uplink CC1.

The common uplink PCC for UE Z may belong in the same TAG for nodes A and B. In this case, UE Z may receive timing advances from node A and/or B and may adjust its transmit timing for the common uplink PCC based on the timing advances. Uplink transmissions from UE Z on the common uplink PCC would be properly time aligned at nodes A and B.

Alternatively, the common uplink PCC for UE Z may belong in different TAGs for nodes A and B. In this case, UE Z may receive first timing advances from node A and may adjust its transmit timing for uplink transmission on the common uplink PCC to node A based on the first timing advances. UE Z may receive second timing advances from node A and may adjust its transmit timing for uplink transmission on the common uplink PCC to node B based on the second timing advances. UE Z may account for different TAGs as described above.

Multiflow may also be supported on the uplink for the PUSCH. In this case, a multi-UL capable UE may send data on a PUSCH on each uplink CC configured for the UE.

Figure 9:
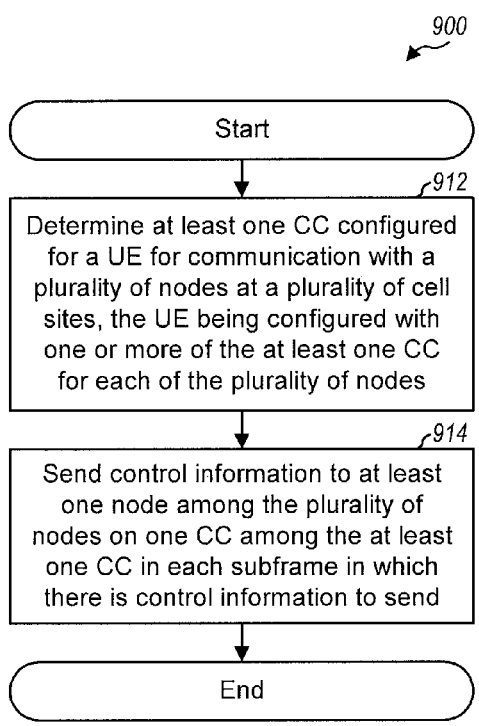
FIG. 9 shows a design of a process for sending control information.

FIG. 9 shows a design of a process 900 for sending control information. Process 900 may be performed by a UE (as described below) or by some other entity. The UE may be a single-UL capable UE and may be able to transmit on one uplink CC at any given moment. The UE may determine at least one CC configured for the UE for communication with a plurality of nodes located at a plurality of cell sites (block 912). The UE may be configured with one or more of the at least one CC for each of the plurality of nodes. The UE may send control information to at least one node among the plurality of nodes on one CC among the at least one CC in each subframe in which there is control information to send (block 914).

In one design, the UE may determine an uplink PCC configured for the UE for the plurality of nodes. The uplink PCC may be one of the at least one CC configured for the UE. An uplink PCC for a node may be a CC designated to carry control information from the UE to that node and may also be referred to as a designated CC. The UE may send the control information to the at least one node on the uplink PCC. In one design, the uplink PCC may be associated with common timing advances from the plurality of nodes, which may belong in a single TAG. In another design, the uplink PCC may be associated with different timing advances from the plurality of nodes, which may belong in different TAGs.

In one aspect, the plurality of nodes may be time division multiplexed on the uplink PCC. The UE may receive information (e.g., a TDM pattern) indicative of subframes allocated to each of the plurality of nodes. For example, at least two consecutive subframes may be allocated to each node in each cycle of the TDM pattern. The UE may send control information to each node in subframes allocated to the node.

In another aspect, the UE may bundle ACK/NACK for a first node among the plurality of nodes. The UE may send the bundled ACK/NACK to the first node in a subframe allocated to the first node. In one design, the UE may obtain at least one CSI reporting configuration for the UE for the first node. The at least one CSI reporting configuration may schedule the UE to report CSI for the first node in subframes allocated to the first node.

The plurality of nodes can also be frequency division multiplexed on the uplink PCC. The plurality of nodes may be allocated different frequency regions on the uplink PCC, e.g., as shown in FIG. 7A. The UE may receive signaling indicating resource blocks on the uplink PCC assigned to the UE for the plurality of nodes. The UE may be assigned contiguous resource blocks on the uplink PCC for the plurality of nodes. The UE may send control information for each node of the plurality of nodes in resource blocks assigned to the UE for the node. The UE may generate an uplink transmission comprising control information for the plurality of nodes and being sent on resource blocks on the uplink PCC assigned to the UE for the plurality of nodes. The UE may set the transmit power of the portion of the uplink transmission sent to each node based on power control by that node.

In another aspect, the UE may send a joint transmission to the plurality of nodes. The UE may multiplex control information for the plurality of nodes. The control information for different nodes may be specific to the UE sending it. The UE may generate a single control message for the plurality of nodes based on the multiplexed control information. The UE may generate a single uplink transmission for the control message based on a set of parameters applicable for the plurality of nodes, which may comprise a cell ID, a C-RNTI, a resource index for a control channel format, an orthogonal sequence, some other parameter, or a combination thereof. The UE may then send the single uplink transmission comprising the control message to the plurality of nodes. The UE may set the transmit power of the single uplink transmission based on the highest required transmit power among required transmit powers for the plurality of nodes.

Figure 10:
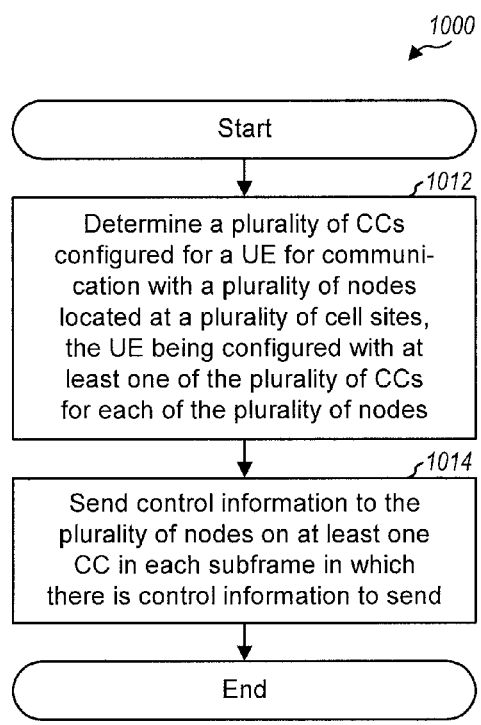
FIG. 10 shows an exemplary design of a process for sending control information.

FIG. 10 shows an exemplary design of a process 1000 for sending control information. Process 1000 may be performed by a UE (as described below) or by some other entity. The UE may be a multi-UL capable UE and may be able to transmit on multiple uplink CCs concurrently. The UE may determine a plurality of CCs configured for the UE for communication with a plurality of nodes located at a plurality of cell sites (block 1012). The UE may be configured with at least one of the plurality of CCs for each of the plurality of nodes. The UE may send control information to the plurality of nodes on at least one CC in each subframe in which there is control information to send (block 1014).

The UE may be configured with a separate uplink PCC for each node. The UE may determine an uplink PCC configured for the UE for each of the plurality of nodes. The UE may send control information to each node on the uplink PCC for that node. In another design, the UE may be configured with a common uplink PCC for all nodes. The UE may determine an uplink PCC configured for the UE for the plurality of nodes. The UE may send the control information to the plurality of nodes on the uplink PCC. The plurality of nodes may be time division multiplexed or frequency division multiplexed on the uplink PCC. For both designs, the UE may receive RRC signaling configuring the UE with the uplink PCC for each of the plurality of nodes.

Figure 11:
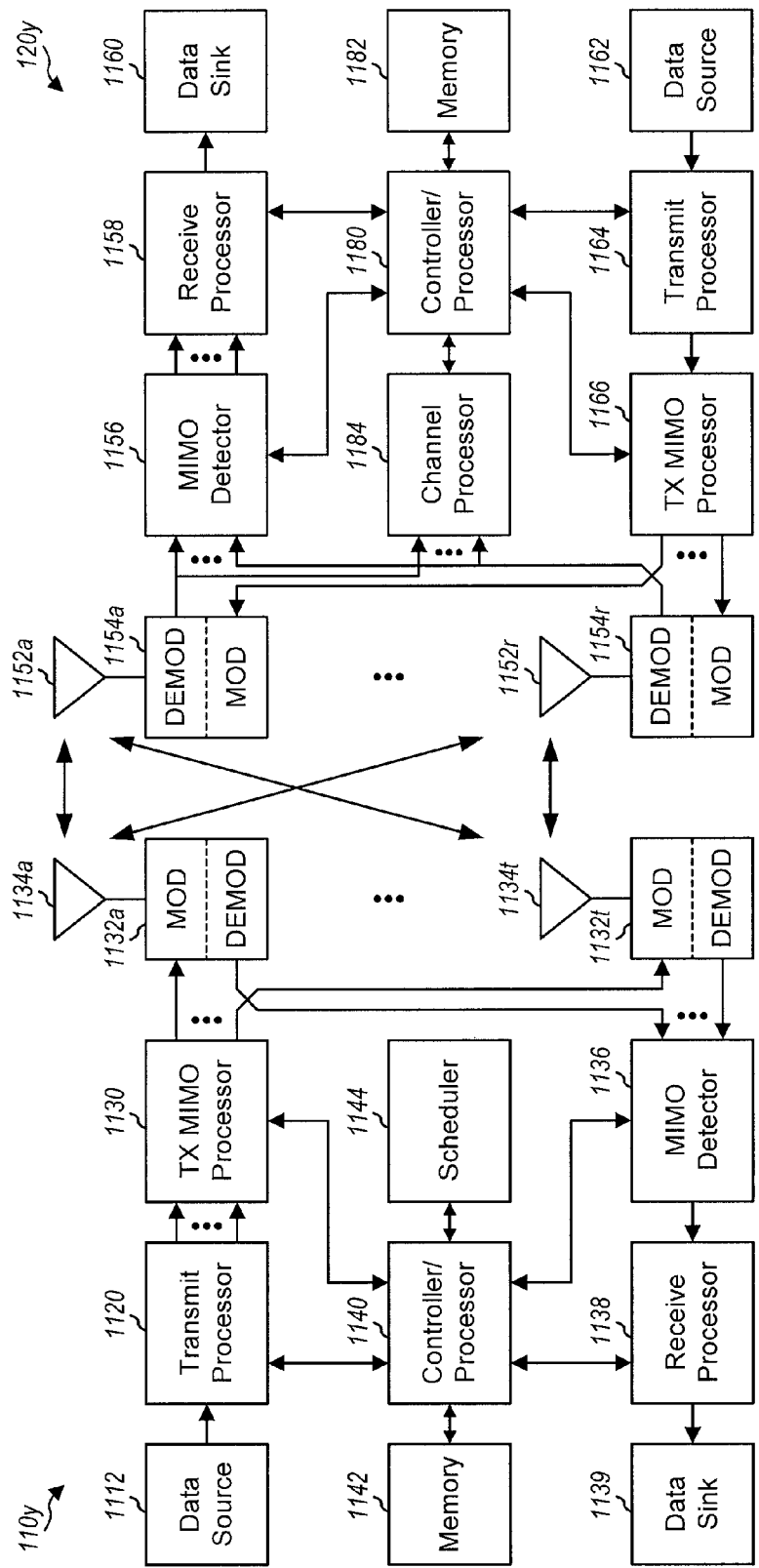
FIG. 11 shows a block diagram of a design of a base station or an eNB and a UE, which may be one of the base stations/eNBs and one of the UEs in FIG. 1.

FIG. 11 shows a block diagram of a design of a node 110y (e.g., a base station or an eNB) and a UE 120y, which may be one of the base stations/eNBs and one of the UEs in FIG. 1. Node 110y may be equipped with T antennas 1134a through 1134t, and UE 120y may be equipped with R antennas 1152a through 1152r, where in general T>1 and R>1.

At node 110y, a transmit processor 1120 may receive data from a data source 1112 for one or more UEs, process (e.g., encode and modulate) the data for each UE based on one or more modulation and coding schemes (MCSs) selected for that UE, and provide data symbols for all UEs. Transmit processor 1120 may also process control information (e.g., for downlink grants, uplink grants, CSI request, configuration messages, etc.) and provide control symbols. Processor 1120 may also generate reference symbols for reference signals. A transmit (TX) multiple-input multiple-output (MIMO) processor 1130 may precode the data symbols, the control symbols, and/or the reference symbols (if applicable) and may provide T output symbol streams to T modulators (MOD) 1132a through 1132t. Each modulator 1132 may process its output symbol stream (e.g., for OFDM, etc.) to obtain an output sample stream. Each modulator 1132 may further condition (e.g., convert to analog, amplify, filter, and upconvert) its output sample stream to obtain a downlink signal. T downlink signals from modulators 1132a through 1132t may be transmitted via T antennas 1134a through 1134t, respectively.

At UE 120y, antennas 1152a through 1152r may receive the downlink signals from node 110y and/or other nodes and may provide received signals to demodulators (DEMODs) 1154a through 1154r, respectively. Each demodulator 1154 may condition (e.g., filter, amplify, downconvert, and digitize) its received signal to obtain input samples. Each demodulator 1154 may further process the input samples (e.g., for OFDM, etc.) to obtain received symbols. A MIMO detector 1156 may obtain received symbols from all R demodulators 1154a through 1154r, perform MIMO detection on the received symbols if applicable, and provide detected symbols. A receive processor 1158 may process (e.g., demodulate and decode) the detected symbols, provide decoded data for UE 120y to a data sink 1160, and provide decoded control information to a controller/processor 1180. A channel processor 1184 may measure the channel response for different nodes and different CCs based on reference signals received from the nodes and on different CCs and may determine CSI for each CC of each node of interest.

On the uplink, at UE 120y, a transmit processor 1164 may receive and process data from a data source 1162 and control information from controller/processor 1180. The control information may comprise CSI, ACK/NACK, SR, etc. Processor 1164 may also generate reference symbols for one or more reference signals. The symbols from transmit processor 1164 may be precoded by a TX MIMO processor 1166 if applicable, further processed by modulators 1154a through 1154r (e.g., for SC-FDM, OFDM, etc.), and transmitted to node 110y. At node 110y, the uplink signals from UE 120y and other UEs may be received by antennas 1134, processed by demodulators 1132, detected by a MIMO detector 1136 if applicable, and further processed by a receive processor 1138 to obtain decoded data and control information sent by UE 120y and other UEs. Processor 1138 may provide the decoded data to a data sink 1139 and the decoded control information to controller/processor 1140.

Controllers/processors 1140 and 1180 may direct the operation at node 110y and UE 120y, respectively. Processor 1180 and/or other processors and modules at UE 120y may perform or direct process 900 in FIG. 9, process 1000 in FIG. 10, and/or other processes for the techniques described herein. Memories 1142 and 1182 may store data and program codes for node 110y and UE 120y, respectively. A scheduler 1144 may schedule UEs for data transmissions on the downlink and/or uplink.

Figure 12:
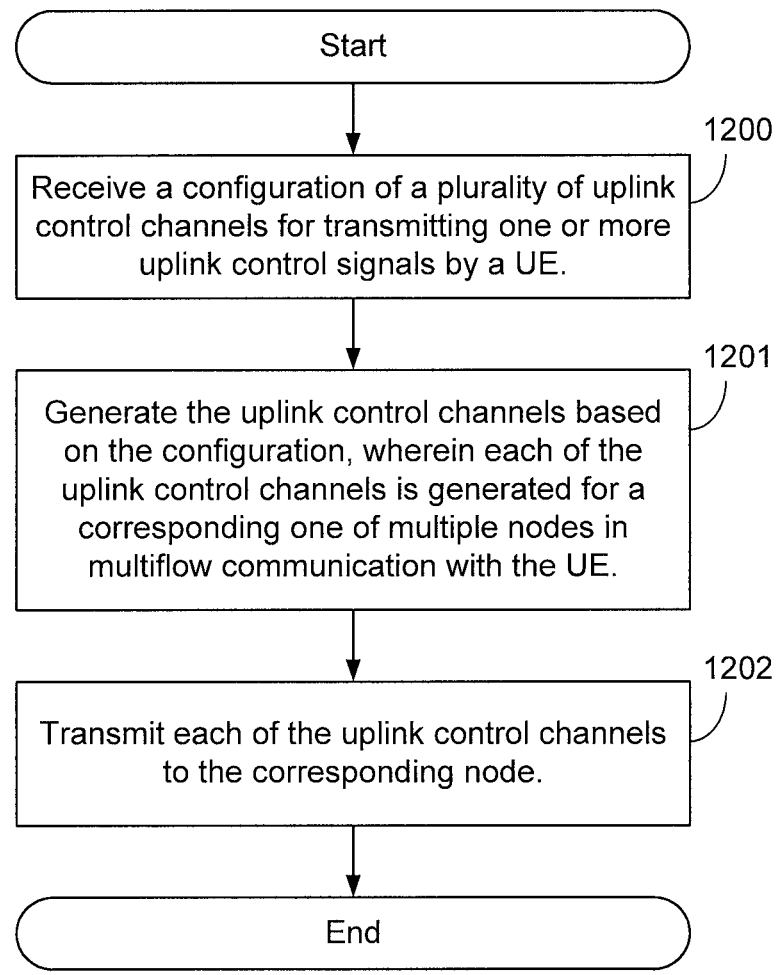

FIG. 12 is a block diagram illustrating example blocks executed to implement one aspect of the present disclosure. At block 1200, a UE receives a configuration of a plurality of uplink control channels for transmitting one or more uplink control signals by the UE. The configuration may be received by the UE via RRC signaling and includes a configuration for the uplink control channels and the resources over which these uplink control channels will be transmitted by the UE.

At block 1201, the UE generates uplink control channels based on the configuration, where each of the uplink control channels is generated for a corresponding one of multiple nodes in multiflow communication with the UE. As indicated above, the multiflow communication indicates that the nodes are non co-located and do not have ideal back haul communication conditions between each of the nodes. The UE generates the uplink control information for each of the uplink control channels as indicated by the configuration.

At block 1202, the UE transmits each of the uplink control channels to the corresponding node according to the configuration. Each of the uplink control channels will have one or more uplink control signals transmitting to the specific, corresponding node.

Figure 13:
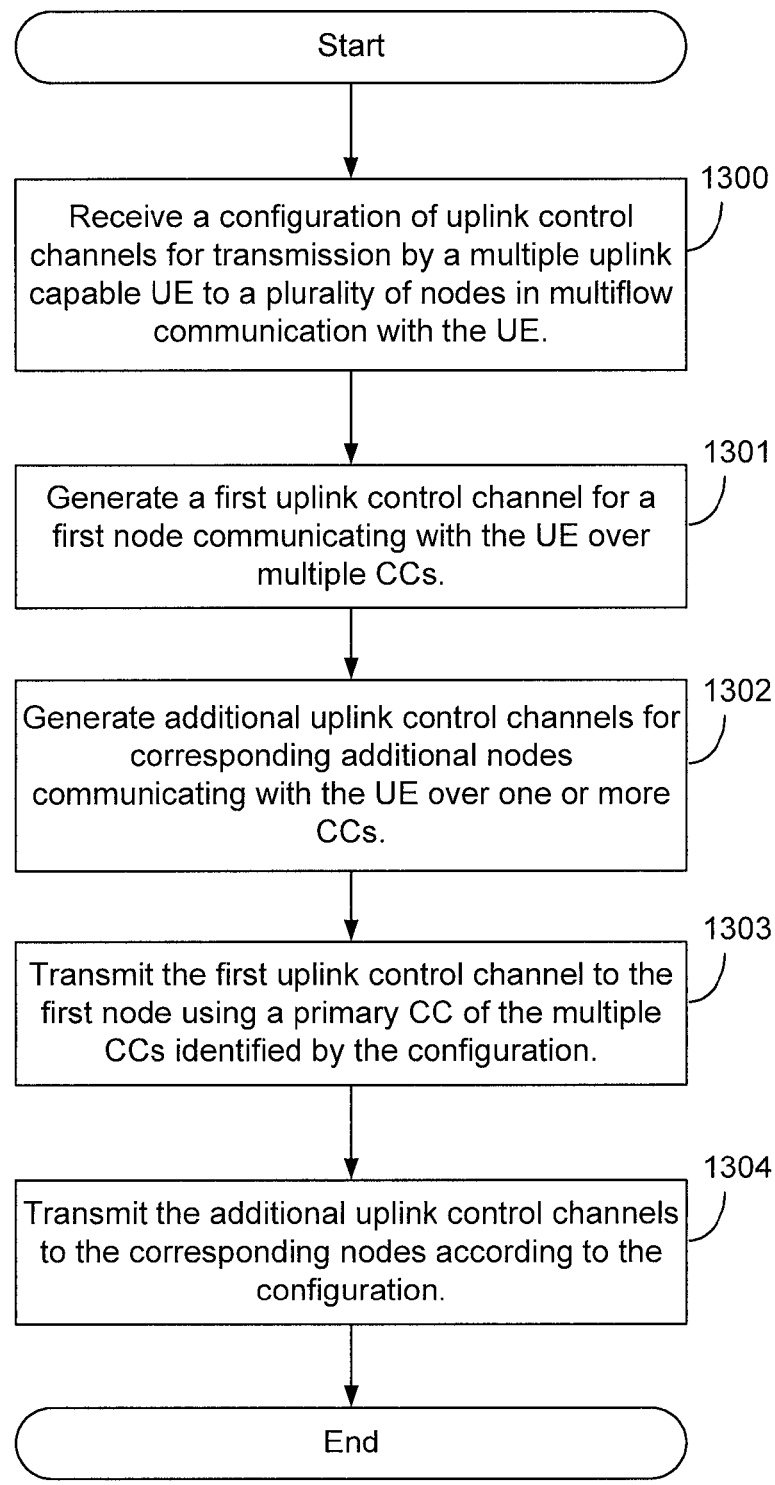

In various aspects of the present disclosure, the UE may be capable of simultaneous uplink transmission using multiple uplink radios, while in other aspects of the present disclosure, the UE may only be capable of uplink transmission using a single frequency at a time. FIG. 13 is a block diagram illustrating example blocks executed to implement one aspect of the present disclosure for a UE having multiple uplink transmission capabilities. At block 1300, the multiple uplink capable UE receives a configuration of uplink control channels for transmission to multiple nodes in multiflow communication with the UE. The configuration may be received by the UE via RRC signaling.

At block 1301, the UE generates a first uplink control channel for a first node communicating with the UE using multiple CCs. Thus, the UE communicates with the first node using carrier aggregation with a configured set of CCs. The UE, according to the configuration, generates the first uplink control channel with the various one or more uplink control signals for the first node.

At block 1302, the UE generates additional uplink control channels according to the configuration for transmission to corresponding additional nodes using various CCs. Some of the other nodes that the UE is communicating with may be communicating over a single CC, while others of the nodes communicating with the UE may also be communicating using carrier aggregation and a configured set of multiple CCs. The UE may generate the additional uplink control channels with the additional uplink control information for the nodes at the same time it is generating the first uplink control channel.

At block 1303, the UE transmit the first uplink control channel to the first node using a primary CC of the multiple CCs that was designated or identified by the configuration. The configuration information received by the UE indicates which of the multiple CCs that the UE is communicating with the first node should be used to send the common control channel. Uplink control information that pertains to any of the multiple CCs and the first node will be contained in the uplink control channel transmitted using the designated primary CC.

At block 1304, the UE transmits the additional uplink control channels to the corresponding nodes according to the configuration. Using the configuration information regarding the other nodes and the other CCs, the UE will transmit the other uplink control channels, including the additional uplink control information for the other CCs and nodes, to the other nodes.

Figure 14:
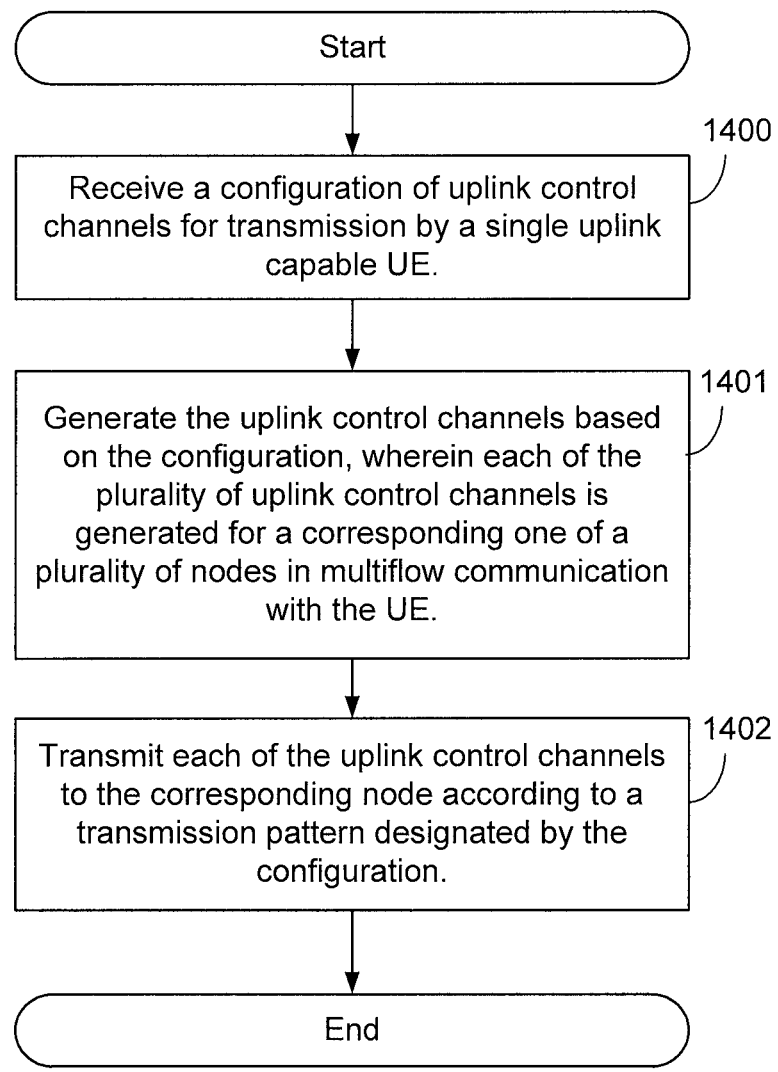

FIG. 14 is a block diagram illustrating example blocks executed to implement one aspect of the present disclosure for a UE having only a single uplink transmission capability. At block 1400, the UE receives a configuration of uplink control channels for transmission to multiple nodes in multiflow communication with the UE. The configuration may be received by the UE via RRC signaling.

At block 1401, the UE generates the uplink control channels based on the configuration, wherein each of the plurality of uplink control channels is generated for a corresponding one of the plurality of nodes in multiflow communication with the UE.

At block 1402, the UE transmits each of the uplink control channels to the corresponding node according to a pattern designated by the configuration. Because the UE is a single uplink transmission-capable UE, it may only transmit on one frequency at a time. Accordingly, the configuration may provide a transmission pattern, such as a TDM or FDM pattern, so that the UE may multiplex the appropriate uplink control channels, including the various uplink control signals associated with the corresponding nodes, to the appropriate node at the appropriate frequency or time. When using a TDM approach, the configuration information may also provide for bundling of ACK/NACK and CSI feedback.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
receiving, at a user equipment (UE), a configuration of a plurality of physical uplink control channels (PUCCHs) for transmitting one or more uplink control signals by the UE;
generating, by the UE, the plurality of PUCCHs based on the configuration, wherein each of the plurality of PUCCHs is generated for a corresponding one of a plurality of nodes in multiflow communication with the UE; and
transmitting, by the UE, each of the plurality of PUCCHs to the corresponding one of the plurality of nodes,
wherein one or more component carriers (CCs) over which the UE communicates with a first node of the plurality of nodes are in a different timing adjustment group (TAG) than one or more additional CCs over which the UE communicates with a second node of the plurality of nodes.

2. The method of claim 1, wherein the configuration is received via a radio resource control (RRC) message.

3. The method of claim 1, wherein the configuration designates one uplink component carrier for each node in the plurality of nodes as a primary component carrier (PCC).

4. The method of claim 3, wherein transmitting the plurality of PUCCHs comprises transmitting control information associated with the corresponding one of the plurality of nodes on the uplink component carrier designated as the PCC for the corresponding one of the plurality of nodes.

5. The method of claim 3, wherein the PCC designated for a first node in communication with the UE belongs to a different timing advance group (TAG) than the PCC designated for a second node in communication with the UE.

6. The method of claim 5, wherein the plurality of nodes comprises nodes of different power classes such that a first node is a macro node, and a second node is one of a femto node, a pico node, or a home eNB.

7. The method of claim 5, wherein the configuration comprises a carrier aggregation configuration with respect to component carriers of at least one node in the plurality of nodes.

8. An apparatus configured for wireless communication, comprising:
means for receiving, at a user equipment (UE), a configuration of a plurality of physical uplink control channels (PUCCHs) for transmitting one or more uplink control signals by the UE;
means for generating, by the UE, the plurality of PUCCHs based on the configuration, wherein each of the plurality of PUCCHs is generated for a corresponding one of a plurality of nodes in multiflow communication with the UE; and
means for transmitting, by the UE, each of the plurality of PUCCHs to the corresponding one of the plurality of nodes,
wherein one or more component carriers (CCs) over which the UE communicates with a first node of the plurality of nodes are in a different timing adjustment group (TAG) than one or more additional CCs over which the UE communicates with a second node of the plurality of nodes.

9. The apparatus of claim 8, wherein the configuration is received via a radio resource control (RRC) message.

10. The apparatus of claim 8, wherein the configuration designates one uplink component carrier for each node in the plurality of nodes as a primary component carrier (PCC).

11. The apparatus of claim 10, wherein means for transmitting the plurality of PUCCHS comprises means for transmitting control information associated with the corresponding one of the plurality of nodes on the uplink component carrier designated as the PCC for the corresponding one of the plurality of nodes.

12. The apparatus of claim 10, wherein the PCC designated for a first node in communication with the UE belongs to a different timing advance group (TAG) than the PCC designated for a second node in communication with the UE.

13. The apparatus of claim 12, wherein the plurality of nodes comprises nodes of different power classes such that a first node is a macro node, and a second node is one of a femto node, a pico node, or a home eNB.

14. The apparatus of claim 12, wherein the configuration comprises a carrier aggregation configuration with respect to component carriers of at least one node in the plurality of nodes.

15. A non-transitory computer-readable medium having program code recorded thereon, the program code comprising:
program code for causing a computer to receive, at a user equipment (UE), a configuration of a plurality of physical uplink control channels (PUCCHs) for transmitting one or more uplink control signals by the UE;
program code for causing the computer to generate, by the UE, the plurality of PUCCHs based on the configuration, wherein each of the plurality of PUCCHs is generated for a corresponding one of a plurality of nodes in multiflow communication with the UE; and
program code for causing the computer to transmit, by the UE, each of the plurality of PUCCHs to the corresponding one of the plurality of nodes,
wherein one or more component carriers (CCs) over which the UE communicates with a first node of the plurality of nodes are in a different timing adjustment group (TAG) than one or more additional CCs over which the UE communicates with a second node of the plurality of nodes.

16. The non-transitory computer-readable medium of claim 15, wherein the configuration designates one uplink component carrier for each node in the plurality of nodes as a primary component carrier (PCC).

17. The non-transitory computer-readable medium of claim 16, wherein the program code for causing the computer to transmit the plurality of PUCCHs comprises program code for causing the computer to transmit control information associated with the corresponding one of the plurality of nodes on the uplink component carrier designated as the PCC for the corresponding one of the plurality of nodes.

18. The non-transitory computer-readable medium of claim 16, wherein the PCC designated for a first node in communication with the UE belongs to a different timing advance group (TAG) than the PCC designated for a second node in communication with the UE.

19. The non-transitory computer-readable medium of claim 18, wherein the plurality of nodes comprises nodes of different power classes such that a first node is a macro node, and a second node is one of a femto node, a pico node, or a home eNB.

20. The non-transitory computer-readable medium of claim 18, wherein the configuration comprises a carrier aggregation configuration with respect to component carriers of at least one node in the plurality of nodes.

21. An apparatus configured for wireless communication, the apparatus comprising:

at least one processor; and a memory coupled to the at least one processor, wherein the at least one processor is configured:

to receive, at a user equipment (UE), a configuration of a plurality of physical uplink control channels (PUCCHs) for transmitting one or more uplink control signals by the UE;

to generate, by the UE, the plurality of PUCCHs based on the configuration, wherein each of the plurality of PUCCHs is generated for a corresponding one of a plurality of nodes in multiflow communication with the UE; and to transmit, by the UE, each of the plurality of PUCCHs to the corresponding one of the plurality of nodes, wherein one or more component carriers (CCs) over which the UE communicates with a first node of the plurality of nodes are in a different timing adjustment group (TAG) than one or more additional CCs over which the UE communicates with a second node of the plurality of nodes.

22. The apparatus of claim 21, wherein the configuration is received via a radio resource control (RRC) message.

23. The apparatus of claim 21, wherein the configuration designates one uplink component carrier for each node in the plurality of nodes as a primary component carrier (PCC).

24. The apparatus of claim 23, wherein the program code for causing the computer to transmit the plurality of PUCCHs comprises program code for causing the computer to transmit control information associated with the corresponding one of the plurality of nodes on the uplink component carrier designated as the PCC for the corresponding one of the plurality of nodes.

25. The apparatus of claim 23, wherein the PCC designated for a first node in communication with the UE belongs to a different timing advance group (TAG) than the PCC designated for a second node in communication with the UE.

26. The apparatus of claim 25, wherein the plurality of nodes comprises nodes of different power classes such that a first node is a macro node, and a second node is one of a femto node, a pico node, or a home eNB.

27. The apparatus of claim 25, wherein the configuration comprises a carrier aggregation configuration with respect to component carriers of at least one node in the plurality of nodes.

\* \* \* \* \*